Jan. 4, 1966    H. B. SADLER    3,227,330
DEVICE FOR SEALING, OPENING, MEASURING AND DISPENSING
FLOWABLE SUBSTANCES FROM A CONTAINER
Filed March 22, 1965    2 Sheets-Sheet 2
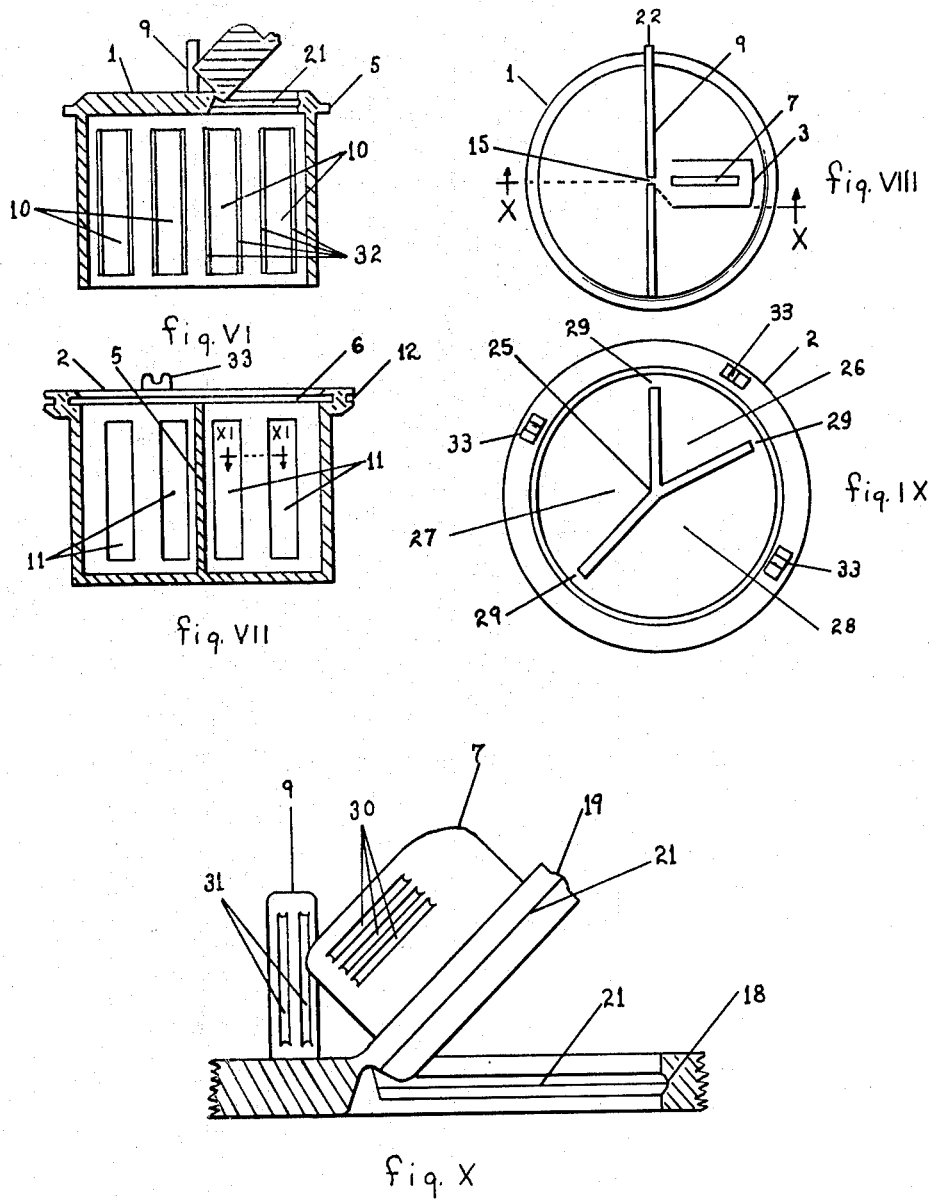
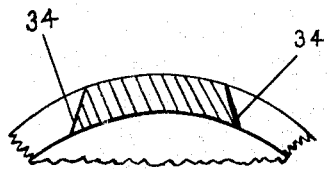
INVENTOR.
BY Harry B. Sadler

United States Patent Office 3,227,330
Patented Jan. 4, 1966

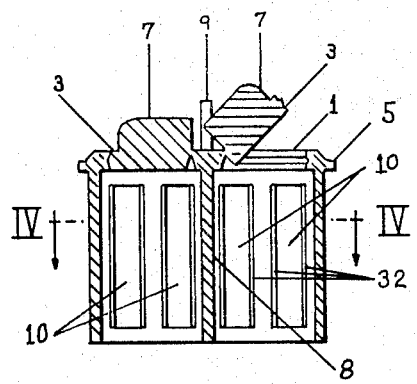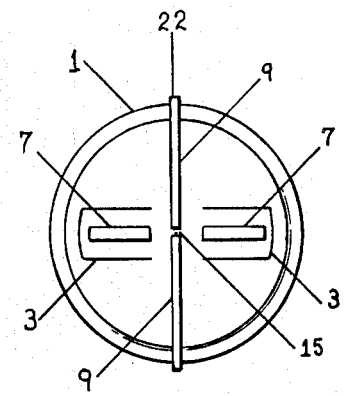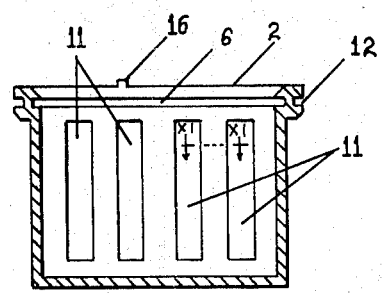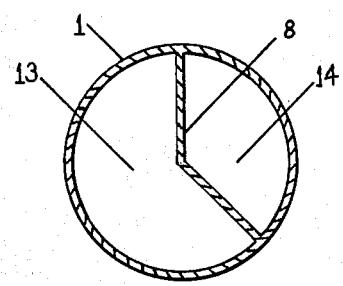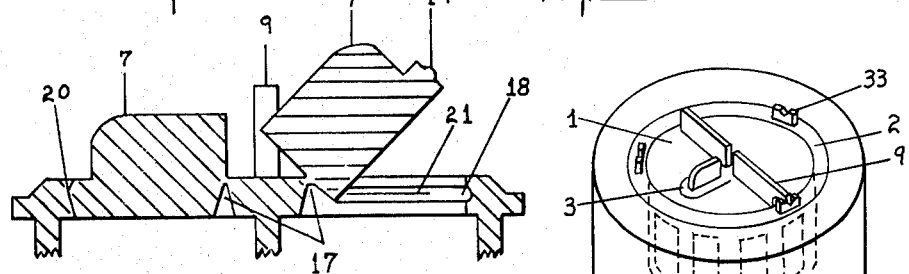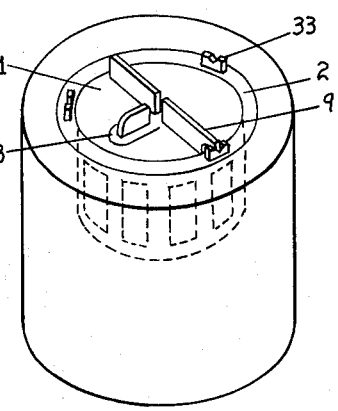

3,227,330
DEVICE FOR SEALING, OPENING, MEASURING AND DISPENSING FLOWABLE SUBSTANCES FROM A CONTAINER
Harry B. Sadler, 622 E. 33rd St., Baltimore, Md.
Filed Mar. 22, 1965, Ser. No. 441,744
7 Claims. (Cl. 222—427)

This invention relates to an improved device for use in dispensing predetermined quantities of flowable substances. These would include powders or other comminuted or granular materials as well as liquids.

The objects of this invention are to provide an economically disposable means of measuring and dispensing materials and liquids from a container, while also acting as a moisture resistant seal which can readily and easily be opened and closed at the user's convenience.

A further object of the invention provides for a novel means of predetermining the amount to be dispensed in one or more quantities, e.g., a teaspoonful, tablespoonful, fractions of an ounce or any other predetermined amounts which the manufacturer of the device wishes to build into it, with one of the contemplated purposes of the device being its utility in the art of cookery, i.e., a useful device in dispensing predetermined amounts of salt, sugar, condiments etc.

It is further contemplated that this device can be utilized in the field of pharmacy and medicine because it can be used to dispense predetermined amounts of drugs and medicine.

A further object is to provide a simple, two-piece, economically manufactured, predetermined quantity dispensing device which can be manufactured from moulded plastic and/or other suitable materials.

These and other objects of this invention will become readily apparent from the following detailed description and appended claims when read in conjunction with the attached drawings.

FIGURE I—Cross section side view of the cylindrical shaped inner part of the device with the opening and sealing spouts at the top of the view, with one spout partially opened and the other closed, hereinafter, for descriptive purposes, known as the male member of the device.

FIGURE II—A cross sectional side view of the cylindrical shaped outer part of the device, hereinafter, for descriptive purposes, known as the female member of the device.

FIGURE III—A top view of the male member shown in FIGURE I.

FIGURE IV—A cross sectional view (on the line IV of FIGURE I) of the entire male member which is shown in a cross sectional side view in FIGURE I.

FIGURE V—An enlarged cross sectional side view of the top portion of the male member.

FIGURE VI—A cross sectional side view of the male member of a modified version of the device having only one spout with no partitions.

FIGURE VII—A cross sectional side view of the female member of the modified version of the device with partitions molded therein.

FIGURE VIII—A top view of the male member of the modified version of the device.

FIGURE IX—A top view of the female member of the modified version of the device.

FIGURE X—An enlarged partial side view of the upper portion of the male member of the device.

FIGURE XI—An enlarged partial cross sectional top view showing the knife edges bordering the vertical sides of the slots or ports of the female member on the line XI in FIGURE II and VII.

The following is a detailed description of how the invention is assembled and operates:

The male member (FIGURE I), containing openings, ports or slits 10 having beveled, sharp vertical edges 32, inserts into the female member (FIGURE II) which also has corresponding openings, ports or slits 11 with beveled, sharp vertical edges 33 and rotates with close tolerance therein, the beveled sharp edges of the members causing a shearing action between said members at said edges. The male member (FIGURE I) is retained or held inside the female member (FIGURE II) by the peripheral extension of its top 5 which presses into the annular groove 6 in the female member 2, the composition of the material of this device being elastic.

The male member is rotated by means of twisting an extension of its top 9. The openings, ports or slits in the male 10 and female 11 members can be opened and sealed depending upon whether they are or are not directly adjacent and juxtaposed to each other. The status of the ports or slits (whether they are opened or closed) is indicated to the user of the device by means of stops 16 on the top and outer edge of the female member 2 with printed designations adjacent to the stops 16 and on the top of the container. These designations can be the words "Pour" and "The Quantity Being Measured."

The top of the male member, as shown in FIGURE III, contains an upright extension 9 which is used to rotate the male member (FIGURE I) by twisting same and which has an outer end 22 which contacts the stops 16 thereby enabling the openings, ports or slits 10 and 11 of the male and female members to be opened or sealed, the top of the male member also contains one or more doors or spouts 3 thereinafter, identified as spouts.

The number of spouts may vary depending upon the number of predetermined measured quantities the manufacturer wishes to build into the device by also varying the number and size of the compartments 13 and 14.

The male member (FIGURE I) will be moulded in one piece, the hinge 17 of the spouts 3 being composed of the same material with the thickness of the hinge being less than the thickness of the top of the male member. FIGURE V is an enlarged cross sectional side view of the upper portion of the male member showing the one-piece moulded construction of the spouts 3 and rotating handle 9. The hinge 17 is moulded in a suitable thickness to allow free movement in operation by means of the flexibility of the material. Areas 18, 19 and 20 depict possible undercut designs to retain the spouts in a closed position. The spouts are initially moulded in a sealed position by a thin membrane or flash 21 which is torn when the spout is initially opened by forcefully lifting same. The tearing of the membrane can be more easily started by moulding a small slit in the membrane 21 at the outer ends 20 of the doors 3 or a series of perforations or indentations through or in the membrane 21. The spouts 3 are held open when handle 7 recedes in the opening 15 and is held by a snug fit on the ribbed or corrugated side surfaces of the spout handles 7 and end surfaces 31 of the rotating handle 9 at the opening 15.

The interior of the male member as shown in FIGURE IV is divided into one or more compartments 13 and 14 by one or more partitions 8, the positioning of which will predetermine the volume of the flowable substance therein and consequently dispensed through the spouts 3 which are positioned over these compartments 13 and 14.

The number of compartments 13 and 14 and spouts 3 moulded into the male member FIGURE I can be varied depending upon how many varied dispensing measurements the manufacturer wishes to build into this version of the device.

It must be understood that the assembled device is attached to the top of a container which holds the flowable substance, adding very little to the outside dimension thereof, the bulk of the device being substantially contained therein.

The entire device is retained in the top of the container by being inserted and pressed into a prepunched hole in the top of the container, said top fitting into a groove 12 moulded into the outside periphery of the top of the female member. The device is prevented from rotating in the top of the container by means of retaining a flat spot in the prepunched hole corresponding to a flat spot moulded into the outside periphery of the top of female member.

It is also possible to mount the device into the top of the container by means of moulding a screw thread into the outside periphery of the top of the female member which can be screwed tightly into the prepunched hole in the top of the container, the hole being punched in the appropriate size to fit the screw thread.

To use the dispensing device, the rotating handle 9 is positioned so that the ports or slits 10 and 11 of the male and female members are aligned with each other so that the flowable substance can enter therethrough and fill the compartments of the male member 13 and 14 when the container is inverted, the force of gravity causing this action, hereinafter, for descriptive purposes, called "charging the device."

While still inverted the handle 9 is rotated to a position whereby the ports or slits 10 and 11 of the male and female members are not aligned nor adjacent to each other, causing the flowable material to be sealed within the compartments of the male member.

The spout located over the compartment containing the amount which the user wishes to dispense is opened and the predetermined amount of flowable substance is discharged through the open spout.

It is possible to build a modified version of this device wherein the dividing partition 25 which separates and determines the various volumes 26, 27 and 28 of flowable materials to be dispensed would be mounted in an upright position inside of and moulded to and with the bottom of the female member 2 with enough clearance 29 to allow the wall of the male member 1 to rotate therein for 360° with close tolerance and friction between the two. By this arrangement only one spout 3 would be necessary to dispense the various amounts from all compartments inasmuch as the spout could be positioned above any one of the compartments.

In this version of the device the status of the ports or slits 10 and 11 i.e. whether they are opened or closed, is indicated to the user of the device by means of moulded stops 33 containing raised notches located in positions on the upper outer rim of the female member and to be centered over the various fixed compartments 26, 27 and 28 therein, these stops will be identified to show the volume of the compartment over which they are centered by printed designations on the top of the container or by moulded printed designations in the upper outer rim of the female member next to the stop. The lower outer edge of the rotating handle 22 when positioned over and in these notches 33 will indicate to the user the amount of flowable material to be dispensed after the device is "charged" as previously described. On this version of the device, there will be a notched stop with the moulded or printed designation "Pour" and when the lower outer edge of the rotating handle is positioned over and in this notch the ports or slits 10 and 11 of the male and female members will be directly adjacent to each other allowing the flowable material to enter the compartments in the female member and thence pour directly through the device and out its spout or, if it is desired, "charge" the device as previously described and dispense the preset amount desired by moving the end of the handle 22 to the stop located at the predesignated amount desired to be dispensed.

I claim:

1. A device for sealing, opening and dispensing flowable substances from a container comprising an outer cylindrical member closed at its bottom, means at its top to secure said device to said container, and having an opening in its side, an inner cylindrical member mounted for rotation inside said outer member and having an opening in its side wall, which in one position of rotation registers with the opening in said outer member, the said side wall of the inner member sealing the opening in the outer member in another position, a pair of spaced extensions on the top of said inner member serving as a handle for rotating said inner member, a closure hingedly mounted on the top of said inner member, a projection of said closure, the size and position of said projection being such that when the said closure is moved to the open position, the projection enters the space between said extensions and is releasably retained thereby.

2. The device of claim 1 wherein there is a partition in said outer member to divide same into a plurality of chambers, there being registering openings in the chambers and the inner member, and there being a closure hingedly mounted on the top of said inner member to be rotated and positioned over the chamber to be dispensed.

3. The device of claim 1 wherein the said inner member is moulded of thicker, plastic material including a hinge of thinner material connecting said inner member and the closure.

4. The device of claim 1 wherein there is a partition in said inner member to divide same into a plurality of chambers, there being registering openings in both chambers and the outer member, and there being a closure on the top of each of said chambers.

5. A container top comprising a base portion and a closure portion all moulded from continuous elastic plastic material, said closure being permanently secured to said base by a hinge integral with said closure and said base and of lesser thickness then said base, other portions of said closure being releasably secured to said base by interfitting undercut and projecting portions, and a rupturable membrane integral with said closure and said body initially sealing said closure.

6. The closure of claim 5 wherein the door and body are of substantial thickness, there being a thin easily rupturable sealing membrane between and integral with said door and body.

7. A closure comprising a main body and a door being moulded of the same elastic plastic type material and formed inside and on the same plane as the main body and which will when unstressed, tend to remain closed, an integral hinge connecting said body and door and having an upright extension of the door, which will pivot when the door is opened, means defining a retaining slot on said body, located in a line perpendicular to said hinge and containing said extension, whereby said extension will be releasably retained in said slot when said door is opened.

References Cited by the Examiner
UNITED STATES PATENTS

| | | | |
|---|---|---|---|
| 181,943 | 9/1876 | Johnston | 222—452 X |
| 1,556,911 | 9/1925 | Callender | 222—450 |
| 2,043,976 | 6/1936 | Schonitzer | 292—275 X |
| 2,826,343 | 3/1958 | Albiani | 222—543 X |
| 2,986,309 | 5/1961 | Larson | 222—543 X |
| 3,101,870 | 8/1963 | Betner | 222—541 |

LOUIS J. DEMBO, *Primary Examiner.*

HADD S. LANE, *Examiner.*